United States Patent
Moore

[11] Patent Number: 5,553,326
[45] Date of Patent: Sep. 10, 1996

[54] REMOVABLE, WASHABLE SWEATBAND FOR HATS

[76] Inventor: Gary L. Moore, 2506 Robin Dr., Plant City, Fla. 33566

[21] Appl. No.: 357,530

[22] Filed: Dec. 16, 1994

Related U.S. Application Data

[63] Continuation of Ser. No. 153,874, Nov. 16, 1993, abandoned.

[51] Int. Cl.⁶ .................................................. A42C 5/02
[52] U.S. Cl. ............................ 2/181; 2/181.4; 2/209.13
[58] Field of Search .............................. 2/2, 171, 171.1, 2/181, 181.2, 181.4, 184, 195.1, 209.11, 209.12, 209.13, 909, 918, 265; 24/399, 400, 587

[56] References Cited

U.S. PATENT DOCUMENTS

| | | |
|---|---|---|
| 1,232,992 | 7/1917 | Stering ........................................... 2/10 |
| 2,717,437 | 9/1955 | De Mestral ................................. 2/265 |
| 4,035,875 | 7/1977 | Kobelt ....................................... 24/587 |
| 4,630,317 | 12/1986 | Brown et al. .......................... 2/DIG. 11 |
| 4,924,525 | 5/1990 | Bartasis .......................................... 2/2 |
| 4,941,210 | 7/1990 | Konucik ................................... 2/181.4 |
| 5,004,356 | 4/1991 | Matsui ..................................... 24/587 |
| 5,025,504 | 6/1991 | Benston et al. ......................... 2/181.4 |
| 5,189,765 | 3/1993 | Singhal ..................................... 24/400 |

Primary Examiner—Diana Biefeld
Attorney, Agent, or Firm—Dominik & Stein

[57] ABSTRACT

A system for adapting a hat of the type which is originally provided with only a permanent sweat band, so that the hat can receive a removable, washable, and reusable sweat band. Hats may also be manufactured with the system in place.

14 Claims, 2 Drawing Sheets

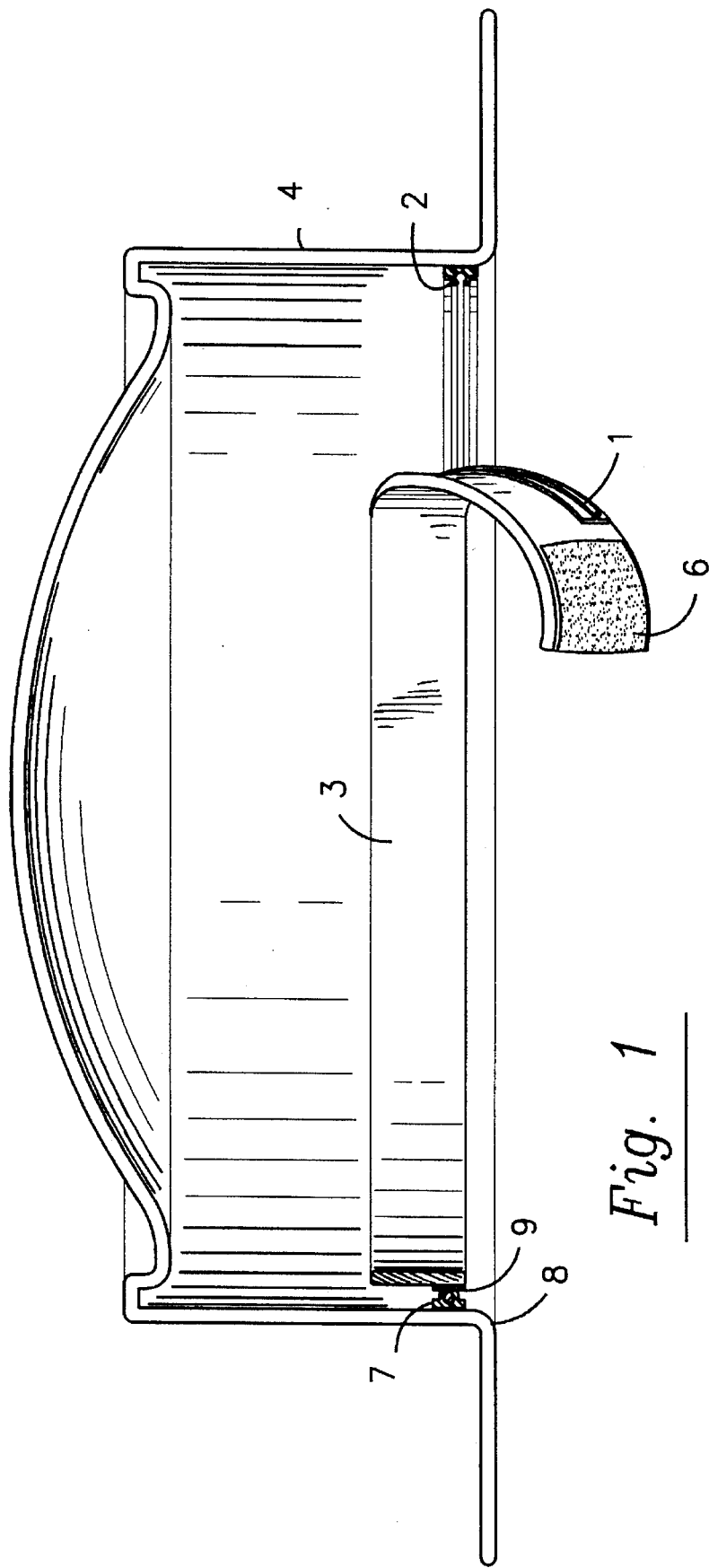
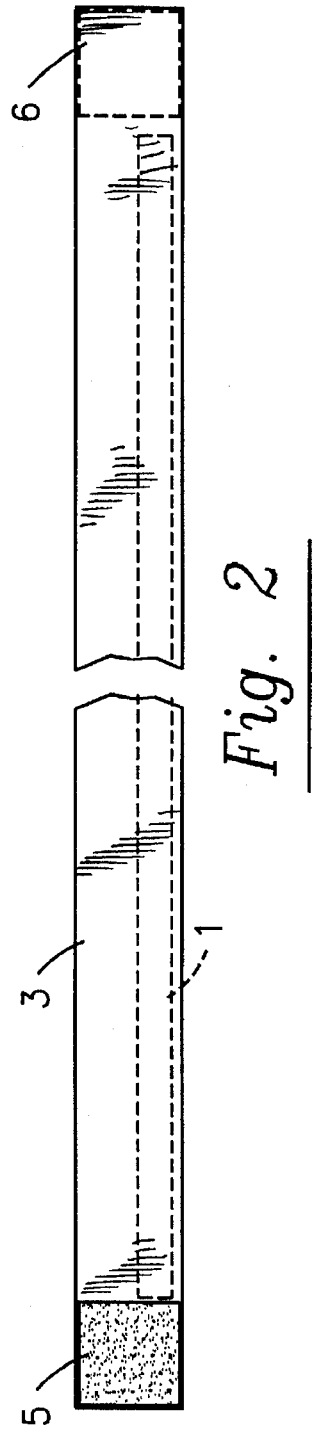
Fig. 1
Fig. 2

REMOVABLE, WASHABLE SWEATBAND FOR HATS

RELATED APPLICATIONS

This is a continuation of U.S. patent application Ser. No. 08/153,874 filed Nov. 16, 1993 now abandoned.

BACKGROUND OF THE INVENTION

1. Field of the Invention

The invention provides a system for adapting a hat of the type which is originally provided with only a permanent sweat band, so that the hat can receive a removable, washable, and reusable sweat band. Hats or caps may also be manufactured with the system in place.

2. Description of the related art

A hat or cap may be provided with a sweatband to improve the comfort of a wearer in warm weather, during exercising, or in other situations which may cause the wearer to sweat. Such a sweat band is usually permanently sewn into the inside of the hat. Examples of such hats include golf hats and cowboy hats. This permanent construction results in several problems to the wearer.

First, the sweat band can absorb only a limited amount of sweat. When the band is soaked with sweat the wearer has only two options: either to wear the hat which is made uncomfortable by the soaked sweat band, or to remove the hat and expose the head to direct sunlight.

Second, after weeks or months of wear, the accumulated sweat in the sweat band tends to render the hat malodorous. This condition becomes noticeable to not only the wearer, but also to those around him. It is commonly accepted that the only cure for this condition is to throw away the hat and to buy a new hat. The owner may be reluctant to discard a hat which may be expensive or to which the owner has developed a sentimental attachment.

It is known to provide a disposable sweat band in hats of the "hard hat" or "safety helmet" type. However, hats of this type are constructed with a hard plastic headband which provides a surface which can readily receive a strip of contact adhesive backed absorbent material. When the absorbent material has exceeded its useful life, the disposable sweatband is pealed off from the hard plastic headband and disgarded. The sweatband can not be reused. Such a disposable sweatband can not be used in a hat which is (1) non-adjustable and already a comfortable fit, and so leaves no room for the insertion a bulky disposable sweatband, and (2) has no plastic surface to which the adhesive backing of a disposable insert may be affixed, and no rigid-ring like structure around which a disposable sweat band may be mounted.

For example, U.S. Pat. No. 5,088,126 teaches an adhesive liner which is adhered to the forehead contacting flap of a hard hat. The liner is attached by means of an adhesive which is preferably a double-sided pressure sensitive adhesive tape.

U.S. Pat. No. 5,058,210 teaches a disposable sweat liner for safety hats, which liner is made of a fabric similar to diapers. The liner is fixed to the existing annular plastic headband carried inside the safety hat by means of pressure sensitive adhesive tabs.

U.S. Pat. No. 5,022,095 teaches a hard hat liner of a construction for fitting over the rim of a hard hat.

U.S. Pat. No. 4,468,817 teaches a liner fastened to a hard annular hat band with snap fasteners.

U.S. Pat. No. 4,274,157 teaches a hat or cap with an adjustable sweat band mounted using a bulky VELCRO construction as best seen in FIGS. 5 and 6.

U.S. Pat. No. 4,011,600 teaches a hat having a sweat band which is adjustable by means of VELCRO, but which is not removable, washable, and reusable.

U.S. Pat. No. 3,906,548 teaches a removable liner for fitting around the head band of a hard hat, which liner has a construction as shown in FIG. 2.

U.S. Pat. No. 5,025,504 teaches a disposable pad-type sweat absorber releasably adhered to a head covering, which may be a hat, cap, surgical head covering, wig, safety helmet, welding mask, etc. (col 3, line 24). The back surface of the liner is coated with an adhesive material for releasably securing the liner to the interior of the head covering (col. 2, line 25; col. 5, lines 44–60). The adhesive is coated onto a backing sheet which backing sheet provides an effective water barrier.

These patents are all concerned with head coverings which have a rigid plastic head liner to which a disposable, sweat-absorptive liner having a contact adhesive backing may be easily adhered. There is, however, nothing in the above-discussed state of the art which shows how to address the problems inherent in hats made of cloth, leather, straw or felt, into which have been permanently sewn sweat bands or elastic cloth liners. The teachings of these patents can not be adapted to, e.g., golf hats or cowboy hats which are constructed of different materials and have no hard plastic headband for receiving an adhesive backed liner.

SUMMARY OF THE INVENTION

It is an object of the present invention to find a solution for the above common problems.

In accordance with the present invention, a system is provided by which a hat having a sweat band or liner permanently attached can be modified to receive a removable, washable, and reusable sweat band, by means of which the hat can be restored to a like-new condition and need not be discarded. The invention is accomplished by removing from the hat the original permanent liner, and adhering in its place a strip of a material, preferably plastic, provided with a first mating closure element which is integral with the strip of material and faces outwardly. A removable hat liner can then be joined to the first mating closure element by means of a strip of material having a second mating closure element adapted for releasably, interlockingly engaging with the first mating closure element and which is integral with the strip of material, and which strip of material is attached to the moisture absorbent material of the hat liner. The moisture absorbent material of the hat liner may be a strip of woven, elastic cloth or any other conventional construction.

Accordingly, by means of the present invention, it becomes possible for the first time to modify a hat which is provided with a permanent liner, which hat is not designed or intended to have the liner removed and replaced. It is a further novel feature of the invention that the modification is accomplished by the use of a very thin, flexible, and inexpensive zip-lock mechanism having a total thickness of less than 5 mm (measured from backing to opposing backing when mating closure elements are engaged), preferably less than 3 mm, most preferably 2 mm or less.

A further feature of the invention is that the hat can be worn in the ordinary manner until the sweat band becomes saturated with sweat, at which time the sweat band can be quickly and easily removed, and a fresh, dry sweat band inserted in its place.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other removable and replaceable hat band systems for carrying out the same purposes of the present invention. It should also be realized by those skilled in the art that such equivalent structures do not depart from the spirit and scope of the invention as set forth in the appended claims.

BRIEF DESCRIPTION OF THE DRAWING

For a fuller understanding of the nature and objects of the present invention reference should be made the following detailed description taken in with the accompanying drawings in which:

FIG. 1 is a side view of a typical hat with a front-to-back cross-section.

FIG. 2 shows the removable sweat band element.

DETAILED DESCRIPTION OF THE INVENTION

Figure 3:
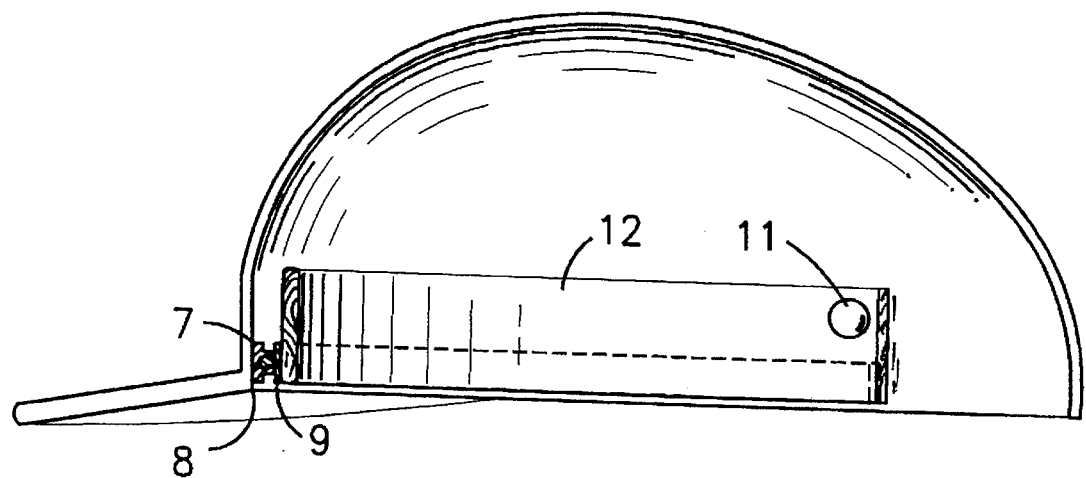
FIG. 3 is a cross-sectional side view of an alternative embodiment of the invention, wherein a cap is manufactured with a removable sweat band in place.

In essence, the present invention can be visualized as having a construction corresponding to a original construction of a hat having a sweatband or "one-size-fits-all" sweat-band type elastic liner, with only the sewing which connects the sweat band to the original hat being replace with a zip-lock type closing means in order to have a sweatband removably and replaceably secured.

With reference to FIG. 1, the removable hat band of the present invention is removably attached by means of a zip-lock type closure means, which means is well known from, e.g., plastic bags provided with such closure means. Typically, the fastening means comprises a strip of material 1 having a first mating closure element and a strip of material 2 having a second mating closure element adapted to receiving and interlocking with the first element 1. One of the elements may be male and disposed on either the hat band 3 or on the hat 4, and the other may be female and disposed on the other of the hat band 3 or on the hat 4. The male and female element are designed so as to be capable of being releasably, interlockingly joined together.

For purposes of description of the embodiment shown in FIG. 1, the element attached to the hat will be referred to as the female element or strip and the element attached to the removable sweat liner will be referred to as the male element or strip. There are, however, variations in comfort of the wearer and ease of attachment depending upon whether the male or female element is attached to the hat, and a preference may be developed for having the female element attached to the sweat band and having the male element attached to the hat.

In order to modify a hat which had been manufactured with a non-removable liner, the existing liner is first removed by cutting, undoing the stitching, tearing, etc. The strip 2 having the female element is adhered inside the crown of the hat in the place of the original attaching area, preferably by means of adhesion as discussed in greater detail below. The sweatband 3 having the male element 1 attached can then be interlocked with the hat by pressing the male and female elements together.

On one side of the sweat band, at a first end of the hat band 3, there is provided a patch of VELCRO, for example, the hook part 5. On the other side of the sweat band, on the second end of the hat band, there is provided a mating patch of VELCRO, for example, the pile part 6. After the removable sweat band has been attached to the hat by means of engagement of the male and female elements, the ends of the hat band are attached with each other by means of the VELCRO patches. Other attaching means may be substitued for the VELCRO patches. For example, a simple hook may be provided on one of the ends of the sweat band. After installation of the sweat band in the hat, the hook from one end of the sweat band can be hooked into the other end of the sweat band so that the sweat band provides a 360 degree, continuous band around the head.

In a preferred embodiment of the invention, the head band is of a "one-size-fits-all" construction having an elastic band which forms an anulus smaller in diameter than the rim. More specifically, the removeable, washable and replaceable head band is comprised of three elements: an element having a closure element for engaging with the colsure element provided on the hat, a narrow (quarter to half inch) non-elastic cloth like element to which the closure element can be sewn, stitched, or otherwise permanently bonded, and a wide (one to two inch) elastic cloth material. The removable liner is produced by first affixing the closure element strip to the narrow cloth strip. Then, the elastic cloth strip is stretched and affixed to the narrow cloth strip while in the stretched state. For example a 26 inch strip of elastic cloth is stretched to 28 inches and sewn onto a 28 inch strip of the narrow cloth. When this removable hat liner is installed in a hat, the stretched cloth will contract and form a "dome" or "cone" like structure inside the hat, which will permit the hat to securely fit onto the head of the wearer. This combination of non-stretching and stretching cloth is well known in the hat art. What is not known is the modification of such a "one-size-fits-all" hat liner to be removable, washable, and reinsertable.

The invention is not limited to the retro-fitting of relatively expensive hats. The invention may also be used to manufacture hats with removable liners already in place. In such a case, the strip of a material provided with a first mating closure element may be attached to the inside of the hat by use of a solvent based adhesive, an emulsion type adhesive, or a hot-melt type adhesive, or may be sewn onto the inside of the hat. There is no limitation as to the manner of fixing the strip of a material provided with a first mating closure element to the hat, so long as the bond is relatively permanent.

Figure 4:
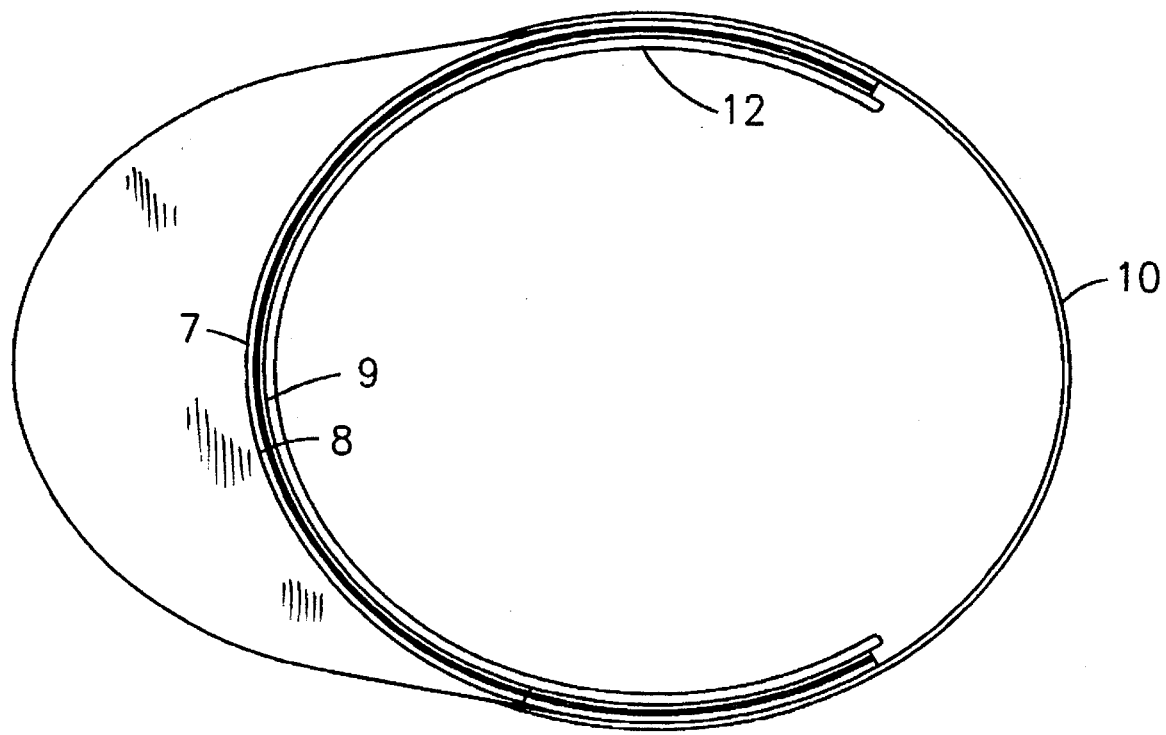
FIG. 4 is a top view of the cap of FIG. 3.

A hat in which the removable sweat band is an integral part of the hat as formed is seen in FIGS. 3 and 4. Cap 10 may be made of any material. If made of a plastic material, first closure element 7 may be formed integrally with the cap. On the other hand, if the cap and closure element are to be formed of different materials, the first mating element may be adhered or sewn into the hat after manufacture of the hat, but prior to sale to the public. Sweat band 9 may be semi-rigid and need only describe a semi-circle, such as a 180 degree arc about the front half of the cap. The top back corners of the sweat band may be attached to the cap by any means such as VELCRO or snap fasteners 11.

The invention may also be used to provide a removable and reusable sweat band for a hat which is not originally designed to be provided with a sweat band. For example, military cap may be adapted to receiving a reusable liner by applying to the existing rigid head band of the helmet or cap, by means of a permanent or pressure sensitive adhesive, a strip of a material provided with a first mating closure element. The removable head band can then be attached in the manner discussed above. Pressure sensitive adhesives are well known, and preferred examples include those mentioned in U.S. Pat. Nos. 5,221,276 and 5,025,504.

Prior art fasteners generally operate by squeezing the male and female elements together with a force sufficient to releasably, interlockingly join the male and female elements. This pressure is normally asserted along the entire length of the interlocking means.

The interlocking arrangement is typically released by exerting opposing force on opposing faces of the interlocked arrangement, the forces being sufficient to separate the male and female elements.

The design of the interlocking means may be any composition used in the art. As shown in U.S. Pat. Nos. 4,186,786; 5,211,481; and 3,416,199, a reclosable bag may be formed of two opposed walls equipped at the mouth with fastener profiles. These profiles include a male profile attached to one wall and a female profile on the other wall. The profiles are shaped so that when they are aligned and pressed together into an engaging relationship they form a continuous closure for the bag. The bag may be opened by pulling the walls apart thereby separating the profiles. Various geometric shapes and arrangements for such profiles are shown in U.S. Pat. Nos. 28,969; 3,323,707; 4,212,337; 4,363,345; 4,561,108; 4,812,056; 2,637,085; 2,746,502; 3,173,184; and 3,338,284.

In addition, U.S. Pat. Nos. 4,736,496 and 5,012,561 disclose reclosable bags with profiles and internal ribs adjacent to the profiles, and stabilizing beams disposed on an outside surface of the bag wall. U.S. Pat. No. 3,338,285 discloses a reclosable bag having several parallel interlocking male and female profiles. In general, the profiles must be such as to provide relatively high resistance to opening from inside the bag while rendering the bag relatively easy to open from the outside. Each of these designs may be selected for their known properties and characteristics, as necessary for a given intended type of hat. For example, a cowboy hat used in horseback riding may be provided with two or more parallel interlocking means, while a single interlocking means is sufficient for a golf hat.

The composition of the interlocking means may be any composition used in the art. For example, reclosable bags used storing household goods are typically made of polyethylene. The preferred plastic resin materials for forming the strips having the respective mating elements are polyolefins and thermoplastic elastomers. The strips are preferably made of a thermoplastic material such as polyethylene by extrusion.

The polymers can be used singularly or blended with other polymer resins. Examples of polyolefins for use herein include linear polyethylene, both low density (LLDPE) and medium density (LMDPE); ethylene vinyl acetate copolymer (EVA); ethylene-methyl acrylate copolymer (EMAC); ethylene-ethyl acrylate copolymer (EEA); ultralow-density polyethylene (ULDPE); and polypropylene random ethylene copolymers. Examples of suitable thermoplastic elastomers include polyester/polyether block polymers, polyamide/polyether block polymers; and inomer metal salts of ethylene/methacrylic acid copolymers.

More preferably, the starting films strain harden and are resistant to stretch or deformation. Exemplary of preferred starting films are materials such as available from Ethyl visQueen of Richmond, Va.; linear very-low-density polyethylene as available from TUREX, Inc. of Harrisville, R.I.; and block co-polymers such as polyester-polyether, which are designated as Hytrel, as available from E. I. DuPont Nemours & Co. of Wilmington, Del.

In order to improve the "breathability" of the hat band, the elements which are made of non-vapor permeable materials are preferably rendered permeable by provisions of pores, holes, etc. In a preferred embodiment of the invention, a heat-seal adhesive is applied to the back surfaces one of the mating closure elements. After the adhesive hardens, the entire element is punctured by means of a punch, press, etc. in order to provide an avenue for moisture escape.

In orded to improve the adhesion of the mating element strip to the hat or to the hat band, the strip is preferably (1) made of a material selected for affinity to a given adhesive, and (2) provided, on the backing surface, with a textured pattern, such as ridges, a waffle pattern, finger like projections, or multiple perforations.

The strip of material having the mating closure elements is preferably provided with perforations which are small enough and sufficient in number in order to increase the pliability and flexibility of the material and thereby improve the fit of the strip to the irregular surface of the inside of the hat.

The adhesive composition may be any one which can adhere a given interlocking member materials and a given hat material. The adhesive may be solvent based, may be an epoxy type adhesive, may be a contact type adhesive, or may be a hot melt adhesive. Preferred adhesives are characterized by the following qualities:

(i) must adhere quickly, but if for home use, must allow realignment and/or adjustment within about a five minute period of time, while also setting fully within 24 hours or less;

(ii) must be able to permanently join the interlocking member, material, such as plastic, vinyl, or nylon, to (a) a cloth like material used as a hat band or sweat liner and/or (b) to a hat material such as cloth, leather, straw or plastic.

The preferred adhesive is a hot-melt adhesive which is non-blocking up to temperatures of up to 110° F. and is low enough in viscosity between 210° and 275° F. to allow for preprinting onto film by at least one printing cylinder or other appropriate means.

Preparation of the preferred adhesive composition involves blending the tackifying resin and anti-oxidant at a temperature above the melting temperature of either material until the mixture is homogeneous. The EVA polymer blend is then added at the same or slightly higher temperature until the blend is homogeneous. When cooled after blending, the resulting mixture is solid and nontacky at ambient temperatures up to approximately 150° C. The composition is also a free flowing liquid at 210° F. and above. After formulating the above preferred composition, a quantity of the adhesive was coated onto polyethylene film.

In the preferred embodiment of the present invention, the adhesive composition contains about 50% or more, by weight, of one or more ethylene vinyl acetate (EVA) thermoplastic polymers. The specific characteristics of the polymer component can be selected by one or ordinary skill in the art of depending on the adhesive's desired properties. Acceptable ethylene vinyl acetate polymers and bonds include those having a melt index of approximately 500 or more and a vinyl acetate content of approximately 28% or more. The melt index is determined using ASTM test 1238.

In selecting the base polymer, it is important that the polymer have a low enough viscosity at application temperature to allow for efficient application processing. Application is preferably by a printing cylinder but may be any coating means used in the art. Additionally, the percentage of polymer in the formula must be adequate to obtain sufficient cohesive strength in the bonded area. A low density polyethylene could be employed if it has a high enough melt index to be processable in the system.

The adhesive can also contain a small amount of a suitable anti-oxidant for stability. The anti-oxidant used will depend on the nature of the composition of other materials. The amount and type of anti-oxidant should be selected taking into consideration the color and physical property stability of the overall formula. A level about 0.2% to 1.0% is usually sufficient to make the formula relatively heat stable. Degradation due to excessive exposure to oxygen and/or excessive or repeated exposure to heat plagues hot melt adhesives. Because of the highly controlled nature of the present process and the use of an anti-oxidant, such degradation does not pose any threat to the integrity of the adhesive.

The adhesive may be precoated onto either the hat, the male or female element, or the sweat band, the elements brought together, and thereafter heat activated to form a bond. A preferred heat activation mechanism employed is operated to activate the precoated film at a temperature below the melt point of the male or female element to avoid distortion, but at the same time activate the adhesive to form an adequate bond. A heater element is preferably automatically controlled to heat the adhesive at varying line speeds.

Formulations of adhesives, methods of coating the adhesive, coating thicknesses, the numbers of layers of contact adhesive, and the various additives for effecting properties such as reduction of tackiness, colorants, etc. are well known in the art and do not, by themselves, constitute a part of this invention. Adhesive compositions and coating and bonding methods are disclosed, for example, in U.S. Pat. No. 5,064,492.

Although the present invention was first designed for providing a removable sweat band for hats originally provided with a permanent sweat band, and thus is particularly suited for retrofitting moderately to expensively priced hats, it will be readily apparent that the system is capable of application to lesser expensive hats, and to the production of hats with removeable, washable, and reuseable hat liners in place. The invention may be in the form of a kit by which the end user can retrofit his own hat, or may be in the form of individual elements by means of which a retailer, for example, a shoe repair shop, can retrofit hats. Finally, the system can be used to provide new hats with the system already in place. Furthermore, the system can be used to modify a hat or cap which is not originally intended to be fitted with a sweatband, such as a helmet or military hat or cap. The invention thus capable of use in a number of other applications. Although this invention has been described in its preferred form with a certain degree of particularity with respect to hats, it is understood that the present disclosure of the preferred form has been made only by way of example and that numerous changes in the details of structures and the composition of the system may be resorted to without departing from the spirit and scope of the invention.

Now that the invention has been described,
What is claimed is:

1. A hat having a crown and including:

a first strip of material having a front side and a back side, said back side of said first strip of material affixed to the lower internal periphery of said crown, said front side of said first strip of material having an outwardly facing first mating closure element extending along substantially the entire length of said strip of material, said mating closure element having a uniform continuous longitudinally-extending profile, said profile of said outwardly facing continuous first mating closure element interlockable with an opposing longitudinally extending profile of a second mating closure element integral with a second strip of material; and a hat liner provided with a second strip of material having a front side and a back side, said front side having a second mating closure element, said second mating closure element having a uniform continuous longitudinally-extending profile, said second mating closure element extending along substantially the entire length of said strip of material and interlockable with said longitudinally extending profile of said first mating closure element and adapted for releasably, interlockingly engaging with said first mating closure element, wherein one of said first and second longitudinally-extending profiles is a male member profile and the other of said first and second longitudinally-extending profiles is a female member profile provided with a longitudinally extending channel extending the length of the strip of material with which it is integral and adapted for receiving and releasably interlockingly engaging said longitudinal male member profile, such that when said male and female elements are aligned and pressed together into an engaging relationship they form a continuous longitudinal engagement which attaches said hat band to said crown of said hat;

and wherein the total thickness measured from the back side of said strip of material provided with the first mating closure element to the back side of said strip of material provided with said second mating closure element when said mating closure elements are engaged is less than 3 mm.

2. A hat as in claim 1, wherein said strip of a material affixed to the lower internal periphery of said crown is affixed by sewing.

3. A hat as in claim 1, wherein said strip of a material affixed to the lower internal periphery of said crown is affixed by means of an adhesive.

4. A hat as in claim 3, wherein said adhesive comprises at least about 50%, by weight, of an ethylene vinyl acetate (EVA) polymer having a melt index of about 500 or more and a vinyl acetate content of at least about 28%.

5. A hat as in claim 4, wherein said adhesive further comprises between about 30% and 50%, by weight, of a tackifying agent having a melt point between about 85° C. and 105° C.

6. A hat as in claim 5, wherein said adhesive further comprises between about 0.2% and 1.0% of a stabilizer.

7. Hat as in claim 3, wherein said adhesive has the following formula:

20.5% EVA having 28% vinyl acetate content and a melt index of 400;

30.0% EVA having 28% vinyl acetate content and a melt index of 800;

44.0% alpha-methyl styrene vinyl toluene monomer hydrocarbon; and a minor amount of an anti-oxidant.

8. A hat as in claim 1, wherein said strip of material affixed to the lower internal periphery of said crown is affixed by coating a hot-melt adhesive onto said strip of material affixed to the lower internal periphery of said crown and subsequently compressing said strip of material affixed to the lower internal periphery of said crown and said hat concurrently with heat activation of said adhesive.

9. A hat as in claim 8, wherein said compressing is accomplished by means of a plurality of compression rollers.

10. A hat as in claim 1, wherein said strip of material provided on said hat liner is bonded by coating a hot-melt adhesive onto said strip of material provided on said hat liner and subsequently compressing said strip of material provided on said hat liner and said hat band concurrently with heat activation of said adhesive.

11. A hat as in claim 1, wherein said strips are adhered by means of adhesive preprinted by at least one printing cylinder which permanently imprints adhesive onto said strips of material.

12. A hat as in claim 1, wherein said strips of material are formed of a thermoplastic resin selected from the group consisting of low density polyethylene, high density polyethylene, linear low density polyethylene, polypropylene, nylon, and interpolymers of ethylene and one or more monomers copolymerizable therewith.

13. A hat as in claim 1, wherein said first and second mating closure elements are formed of plastic.

14. A hat as in claim 1, wherein the total thickness of the first and second closure elements, measured from backing to opposing backing when mating closure elements are engaged, is less than 2 mm.

* * * * *